United States Patent Office 3,372,716
Patented Mar. 12, 1968

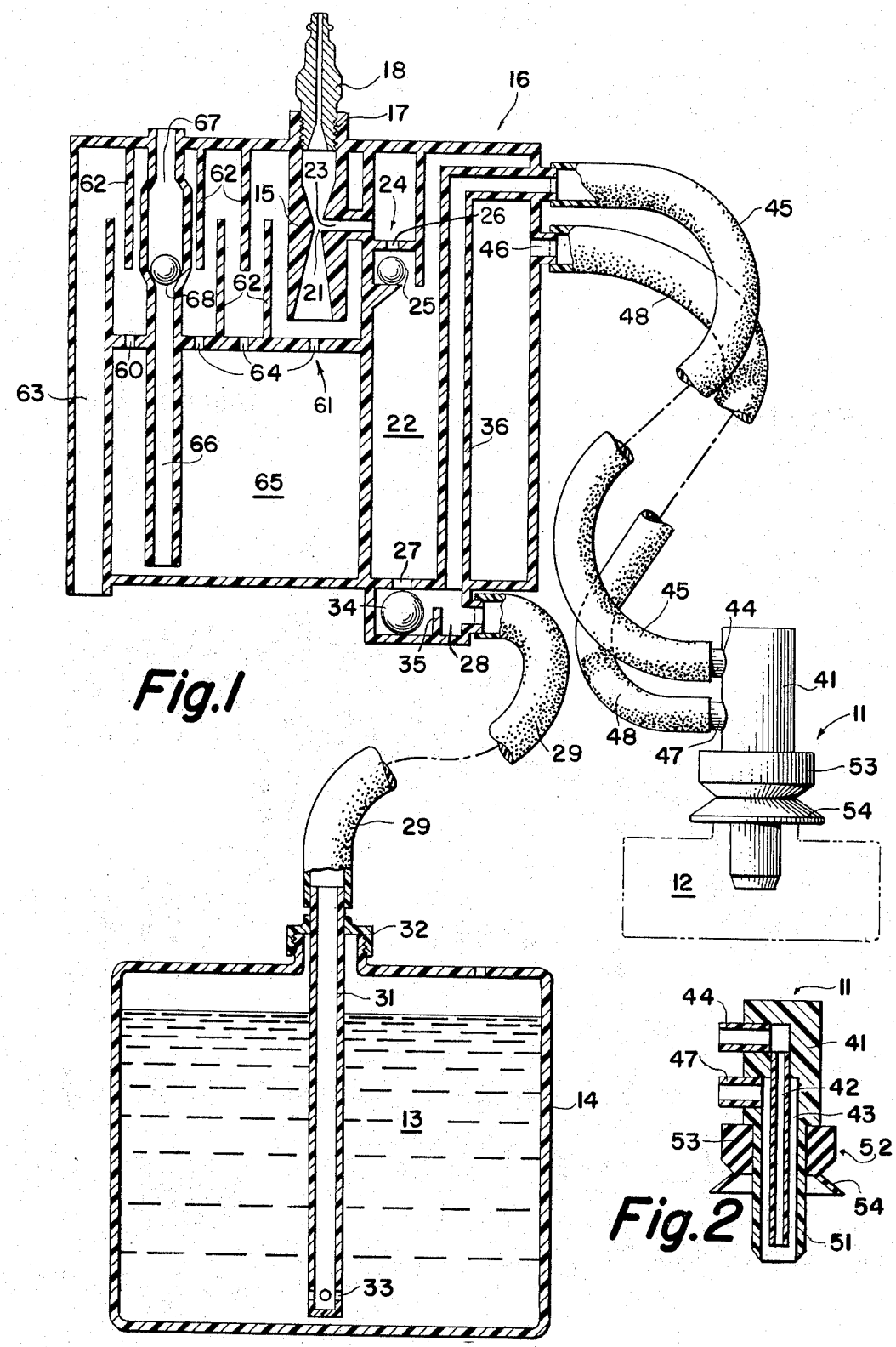

3,372,716
BATTERY FILLER DEVICE
Frederick H. Hommel, Mentor, and Howard T. Havlick, Willoughby, Ohio, assignors to The Electric Storage Battery Company, a corporation of New Jersey
Filed Sept. 15, 1965, Ser. No. 487,440
7 Claims. (Cl. 141—59)

ABSTRACT OF THE DISCLOSURE

A compact battery filling device comprising a Venturi tube as vacuum source, multiple chambers and baffles to muffle and exhaust said Venturi, chamber hermetically connected to filler head and operating as overflow and vacuum chamber, and suitable pathway for electrolyte to be drawn from reservoir to filler head and battery and to be returned to reservoir upon removal of vacuum.

Disclosure of the invention

While the present invention is adapted for many applications, it is particularly adapted for filling storage batteries with electrolyte. A substantial proportion of the storage batteries manufactured today for automotive service are of the dry charged type which are shipped to the dealer in the charged and dry condition without electrolyte. When the battery is sold or placed in service, the dealer fills it with electrolyte. Since battery electrolyte is highly corrosive, it must be handled with extreme care to avoid splashing, dripping and overfilling. In addition, care must be taken to see that the batteries are filled with electrolyte to the proper level. In a busy service station selling a number of batteries a day, this can be a major time-consuming operation.

It is an object of the present invention to provide an inexpensive, efficient and substantially maintenance-free device for filling storage batteries with electrolyte.

It is another object of the present invention to provide a device for filling storage batteries with electrolyte to the proper level in a minimum of time without splashing, dripping or overfilling.

It is still another object of the present invention to provide an electrolyte dispensing apparatus which can be fabricated from noncorrosive materials and with no mechanical moving parts.

It is a further object of the present invention to provide a battery filling device which is adapted for use with standard electrolyte containers.

It is a still further object of the present invention to provide a vacuum filling system for battery electrolyte operated by compressed air such as is readily available in any retail service station or battery distribution outlet.

The foregoing objects of the present invention are accomplished in a unique assembly which utilizes a Venturi tube or other aspirator type device connected to a source of compressed air to create a vacuum for transferring electrolyte from a container to the cell of a battery. The Venturi tube is located in housing which also contains a muffler for the Venturi exhaust and the novel arrangement of valves and overflow chambers which are employed in the cell filler of the present invention. The vacuum used for electrolyte transfer is applied to the battery cell and the electrolyte container through the housing by means of a filler head adapted to be placed in the filler opening of the battery cell. The battery filler is designed to be fabricated entirely from electrolyte resistant materials and contains no mechanical moving parts which can corrode and thus become inoperative.

A better understanding of the present invention may be had from the following description when read with reference to the accompanying drawings of which:

FIG. 1 is a sectional view of a battery filler in accordance with the present invention with portions in elevation and other portions broken away. It is shown in position upon a battery, the outline of which is partially shown in dotted lines; and FIG. 2 is a sectional elevation of the filler head shown in FIG. 1.

Referring now to the drawing, FIG. 1 shows the battery filler of the present invention with a filler head 11 in position in the filler opening of a cell of a battery 12. Only a partial outline of the battery 12 is shown since it forms no part of the present invention and is illustrated only to assist in understanding the construction and operation of the invention. With the filler head 11 in position in the filler opening of a cell of the battery 12, the system of the present invention is adapted to transfer electrolyte 13 from an electrolyte container 14 to the cell of the battery 12.

The battery filler of the present invention utilizes a vacuum to effect the transfer of electrolyte from the container 14 to the battery 12. The vacuum is created by passing compressed air through a Venturi tube 15 located in a housing 16. The Venturi 15 has a threaded input end 17 having therein a standard air pressure reducing valve 18 which is adapted to be connected to a suitable source of compressed air. For this purpose, air at a pressure of from 60 p.s.i. to 150 p.s.i. (dynamic value) such as would be found at any service station is suitable. The Venturi 15 has a throat 21 which is connected to an overflow chamber 22 by means of a passage 23 and a ball-check valve 24. The ball-check valve 24 comprises a valve ball 25 adapted to seat in an opening 26 upon the flow of electrolyte from the chamber 22 through the opening 26.

The overflow chamber 22 has a drain 27 in the bottom thereof which leads to a trap chamber 28. The trap chamber 28 is connected by means of a flexible tube 29 to a siphon tube 31 which is adapted to be inserted into an electrolyte container such as the container 14. To this end, the siphon tube 31 has a gland nut 32 on it which is adapted to be threaded on the electrolyte container 14. The siphon tube 31 has a plurality of openings 33 in its lower end through which electrolyte is drawn when the siphon tube is placed under vacuum. The trap chamber 28 functions as a check valve and houses valve ball 34 which is adapted to seat in and close the drain 27 upon the flow of electrolyte through the trap chamber 28. The valve ball 34 is maintained in position adjacent to the drain 27 by means of a pin 35. An electrolyte feed tube 36 connects the trap chamber 28 to the exterior of the housing 16 near the top thereof.

The filler head 11 which is shown in section in FIG. 2, comprises a body portion 41 having therein a pair of passages 42 and 43. The passage 42 is the electrolyte passage and is connected to the electrolyte feed tube 36 in the housing 16 by means of a nipple 44 and a flexible tube 45. The passage 43 is the vacuum passage and is connected to the overflow chamber 22 at a vacuum outlet port 46 by means of a nipple 47 and a flexible tube 48. The filler head 11 has nozzle end 51 adapted to be inserted into the filler opening of a storage battery cell. The nozzle 51 carries a filler opening seal 52 comprising a collar member 53 provided with a thin, flexible flange 54 extending downwardly and outwardly thereof. The flexible flange 54 is of sufficient diameter to completely cover the filler opening of a battery cell with which it makes contact when the nozzle 51 is in position in the filler opening of a battery. Because of the flexibility of the flange 54, the seal with the cell filler opening is effective without the application of pressure. It is necessary only to bring the flange 54 into contact with the upper edge of the vent opening after which the vacuum occurring in the cell pulls the flange down into contact with the vent opening. The distance that the nozzle 51 projects into the filler opening of a storage battery cell determines the level of the electrolyte added to the battery cell. The filler opening seal 52 is held in position on the nozzle 51 by a snug fit and is adapted to be moved upwards and downwards there along to adjust the electrolyte level. The electrolyte passage 42 is recessed slightly from the end of the nozzle 51. As will be explained in more detail hereinafter, this functions to eliminate the dripping of electrolyte following the filling of a cell.

Air passing through the Venturi 15 is discharged into a muffler chamber 61. The muffler chamber 61 has a series of baffles 62 designed and spaced so as to increase the volume of the air escaping from the Venturi 15. This causes the velocity of air passing through the muffler chamber to be reduced as the air expands so that, when it is exhausted to the atmosphere through an exhaust port 63, it is at a pressure which is approximately 0.2% of the pressure at the inlet end of the pressure reducing valve 18. The muffler chamber 61 is provided with a plurality of drain openings 64 between the baffle plates 62 to permit any fluid trapped in the air passing through the muffler chamber to drain into a muffler overflow chamber 65.

The muffler overflow chamber 65 has a clean-out riser 66 for removing liquids which drain into that chamber from the air passing through the muffler chamber 61. The clean-out riser 66 is provided with an overflow check valve which comprises a valve chamber 67 housing a valve ball 68. The valve ball 68 is designed to seat in the upper end of the valve chamber 67 under the influence of air pressure in the muffler overflow chamber 65 caused by air exhausting from the Venturi 15 and prevents liquids which may collect in that chamber from being blown out the clean-out riser 66. The valve ball 68, however, is purposely designed to have an imperfect fit elsewhere in the valve chamber 67. The diameter of the clean-out riser 66 is made large enough to accommodate the nozzle 51 of the filler head 11 and the valve chamber 67 is so located that the valve ball 68 is forced away from the seat end of the valve chamber 67 by the nozzle 51 when the nozzle 51 is inserted into the clean-out riser 66. As a result, fluid in the muffler overflow chamber 65 can be drawn up through the clean-out riser 66, around the valve ball 68 and returned to the electrolyte container by inserting the filler nozzle 51 into the clean-out riser 66.

The battery filler of the present invention is designed to be made in its entirety from materials which are inert to the corrosive action of the sulphuric acid electrolyte utilized in the automotive-type storage batteries. The housing 16 including the Venturi 15, and the various baffles and partitions therein can be molded out of high-impact polystyrene. The flexible tubes 29, 45 and 48 may be made of vinyl. The filler head 11 and gland nut 32 may be molded of polypropylene which has less tendency to craze, chip or crack. The valve balls 25, 34 and 68 may be made of hard rubber.

In considering the operation of the battery filler of the present invention, the motion of air through the Venturi 15 creates a partial vacuum on the order of 7 to 17 inches of mercury in the overflow chamber 22. If the nozzle 51 of the filler head 11 is placed into the filler opening of a battery with the filler opening seal 52 forming a seal with the cell filler opening, the vacuum in the overflow chamber 22 is applied to the battery cell through the tube 48 and the vacuum passage 43 in the filler head 11. This vacuum is in turn applied to the electrolyte 13 in the container 14 through the electrolyte passage 42 in the filler head 11, the tube 45, the electrolyte feed tube 36, the trap chamber 28, the tube 29 and the siphon tube 31. This vacuum causes electrolyte to be drawn upward through the siphon tube 31 and the tube 29 into the trap chamber 28. The flow of electrolyte through the trap chamber 28 causes the valve ball 34 which is heavier than the fluid to move toward the drain 27. As the valve ball 34 moves toward the drain 27, it is caused to seat in and close the drain 27 by the partial vacuum in the overflow chamber 22. With the drain 27 sealed, the electrolyte is then drawn upward through the electrolyte feed tube 36 and through the tube 45 and the electrolyte passage 42 into the battery cell. During the filling, the level of electrolyte in the battery cell will rise until it reaches the bottom of the nozzle 51. At this point, the electrolyte will be drawn upwards into the vacuum passage 43 and through the tube 48 into the overflow chamber 22. If the housing 16 is molded from transparent plastic, the operator will see the electrolyte entering the overflow chamber 22 and remove the filler head 11 from the vent opening.

Removing the filler head 11 from the vent opening of the battery cell breaks the vacuum at the filler opening seal 52, thus relieving the partial vacuum in the overflow chamber 22 permitting the valve ball 34 to unseat and open the drain 27. When this occurs, electrolyte in the overflow chamber 22 will drain back into the electrolyte container 14 through the trap chamber 28, the tube 29 and the siphon tube 31. It should be noted that at this time, there is enough residual vacuum in the overflow chamber 22 to draw back into it any electrolyte left in the electrolyte feed riser 36 or tube 45. Since the nozzle end of the electrolyte passage 42 in the filler head 11 is slightly recessed from the vacuum passage 43, it is at a negative pressure when the filler head is removed from the battery vent opening. This negative pressure will cause any electrolyte remaining in the flexible tube 45 and the electrolyte passage 42 to be drawn into the vacuum passage 43 and back into the overflow chamber 22 through the tube 48. As a result of this action, the filler head 11 is prevented from dripping electrolyte. The vacuum at the filler head nozzle 51 may be utilized for cleaning up any electrolyte that may have fallen on the top of the battery or which may exist on the battery after it has been given a booster charge. In this respect, the housing 16 must be above the electrolyte container 14 when the filler is in use or electrolyte will not drain back into the container 14 from the overflow chamber 22. It should further be noted that if the housing 16 is so mounted that the filler head 11, when in position in a battery cell filler opening, is above the housing 16, gravity will aid in returning electrolyte which may be in the filler head 11 and tubes 45 and 48 to the container 14. This, however, is not necessary because of the partial vacuum in the overflow chamber 22 as described hereinbefore.

If the operator carelessly leaves the filler head 11 in a battery cell after it has been filled permitting the level of electrolyte in the overflow chamber 22 to rise to where it would be drawn into the Venturi 15 through the opening 23, the ball-check valve 24 will close. The motion of the electrolyte around the valve ball 24 will cause it to rise and seat in the opening 26. When this occurs, the vacuum created by the Venturi 15 will hold the valve ball 25 in the opening 26. This shuts off the vacuum in the overflow chamber 22, and thus, the valve-ball 34 will unseat from the drain opening 27 and the electrolyte in the overflow chamber 22 will flow back into the electrolyte container 14. As the electrolyte drains from the overflow chamber 22, a partial vacuum is formed at the top of the chamber which tends to remove any residual electrolyte left in the flexible tube 45 and the vacuum feed tube 48. When the overflow condition has been relieved, the overflow check valve 24 can be reopened by shutting off the air supply to the Venturi 15. The ball check valve 24 makes the operation of the battery filler of the present invention virtually fool-proof and, barring any accidental handling or deliberate misuse, safe for use by even an unskilled operator.

As noted hereinbefore, the level of the electrolyte in a battery cell is determined by the level of the bottom of the nozzle 51 of the filler head 11. This level may be adjusted by positioning the filler opening seal 52 up or down on the nozzle 51 so that the nozzle will extend into the filler opening the desired distance.

The siphon tube 31 is designed to be used with a standard commercially available five-gallon acid pack and to be secured to it by means of the gland nut 33 although this is not necessary. The gland nut 33 is provided only as an additional safety feature which would tend to prevent electrolyte from being spilled should this type acid container be tipped over. The siphon tube 31 can be also inserted into any type of carboy or used with any open vessel containing fluid. If the siphon tube is used with a polyethylene-type container, its length may be designed so that, when it is inserted into the container, it will not reach to the bottom thereof. This will prevent the siphon tube from being rammed through the bottom of the pack. It should be noted, however, that as electrolyte is extracted from such a container, the pack will collapse permitting the siphon tube to come to rest gently at the bottom thereof permitting all of the electrolyte to be siphoned out during use.

While in the embodiment of the present invention described, the vacuum used to transfer the electrolyte has been achieved by means of a Venturi, it should be noted that any other aspirator-type arrangement operating on compressed air may be used. In this respect, it should also be noted that the moisture which generally is present in air streams from compressors is removed therefrom in the muffler chamber 61 and caused to drain into the muffler overflow chamber 65. In this respect, it should be noted that the opening 60 in the muffler chamber is generally made larger than the other openings 64 so that a positive pressure will not tend to build up in the muffler overflow chamber 65 and cause fluid droplets coming through the smaller openings 64 to be blown back up through the opening 60. The system therefore permits acid overflow and condensed air moisture to collect in the muffler overflow chamber 65 without being exhausted down through the exhaust port 63.

From the foregoing, it can be seen that the battery filler of the present invention provides a system for filling batteries with electrolyte without splashing or overfilling. Moreover, this system is operated by means of compressed air which is generally available at most service stations. Further, the filler has no mechanical moving parts as such as is virtually maintenance free since it can be fabricated entirely from electrolyte-resistant plastics.

Having described this invention, that which is claimed as new is:

1. A battery filling device adapted to transfer electrolyte from a container to the cell of a battery comprising, in combination, a housing having a plurality of chambers, a Venturi having an output adapted to be connected to a source of air under pressure and an outlet discharging into a muffler chamber in said housing, said Venturi having a throat in communication with an overflow chamber in said housing so that a partial vacuum is created in said overflow chamber when air under pressure is passed through said Venturi, a drain in the bottom of said overflow chamber communicating with a trap chamber, first tubing means connected to said trap chamber and adapted to be inserted into a container of electrolyte, valve means in said trap chamber adapted to close said drain upon the flow of electrolyte from said trap chamber into said overflow chamber and to be held closed by the partial vacuum in said overflow chamber, a filling head having a nozzle adapted to be projected through the filler opening of a battery cell and having a pair of passages therethrough, second tubing means connecting the first of said passages with said trap chamber, third tubing means connecting the second of said passages with said overflow chamber and a resilient seal carried by said nozzle and adapted to close said filler opening to apply the partial vacuum in said overflow chamber to the battery cell and to said first tubing means through said trap chamber and said second tubing means, to cause electrolyte in said container to be drawn up through said first tubing means into said trap chamber, wherein said valve means closes said overflow chamber drain and causes the electrolyte to flow through said second tubing means into said battery cell when said partial vacuum is removed from said cell, said valve means in said trap chamber opens, permitting electrolyte in said overflow chamber to flow back through said first tubing means into said electrolyte container.

2. A battery filling device adapted to transfer electrolyte from a container to the cell of a battery comprising, in combination, a housing having a plurality of chambers, a Venturi having an input adapted to be connected to a source of air under pressure and an outlet discharging into a muffler chamber in said housing, said muffler chamber having an exhaust port through which air is exhausted to the atmosphere and a plurality of baffles between said Venturi outlet and said exhaust port so spaced to provide an increasing volume for the air discharged from said venturi and thereby to reduce the velocity of said air prior to being exhausted to the atmosphere, said Venturi having a throat in communication with an overflow chamber in said housing so that a partial vacuum is created in said overflow chamber when air under pressure is passed through said Venturi, a drain in the bottom of said overflow chamber communicating with a trap chamber, first tubing means connected to said trap chamber and adapted to be inserted into a container of electrolyte, valve means in said trap chamber comprising a valve ball adapted to seat in said drain and close said drain upon the flow of electrolyte from said trap chamber into said overflow chamber and to be held closed by the partial vacuum in said overflow chamber, a filling head having a nozzle adapted to be projected through the filler opening of a battery cell and having a pair of passages therethrough, second tubing means connecting the first of said passages with said trap chamber, third tubing means connecting with second of said passages with said overflow chamber, a resilient seal carried by said nozzle and adapted to close said filler opening to apply the partial vacuum in said overflow chamber to the battery cell and to said first tubing means through said trap chamber and said second tubing means, to cause electrolyte in said container to be drawn up through said first tubing means, said trap chamber, and said second tubing means into said battery cell.

3. A battery filling device adapted to transfer electrolyte from a container to the cell of a battery comprising, in combination, a housing having a plurality of chambers, a Venturi having an input adapted to be connected to a source of air under pressure, a throat in communication with an overflow chamber in said housing so that a partial vacuum is created in said overflow chamber when air under pressure is passed through said Venturi, a drain in the bottom of said overflow chamber communicating with a trap chamber, first tubing means connected to said trap chamber and adapted to be inserted into a container of electrolyte, a valve, said valve comprising a valve ball located in said trap chamber and adapted to seal in said drain and close said drain upon the flow of electrolyte from said trap chamber into said overflow chamber and to be held closed by the partial vacuum in said overflow chamber, a filling head having a nozzle adapted to be projected through the filler opening of a battery cell and having a pair of passages therethrough, a second tubing means connecting the first of said passages with said trap chamber, third tubing means connecting the second of said passages with said overflow chamber and a resilient seal carried by said nozzle and adapted to close said filler opening to apply the partial vacuum in said overflow chamber to the battery cell and to said first tubing means through said trap and said second tubing means, to cause electrolyte in said container to be drawn up through said first tubing means into said trap chamber, wherein said ball valve closes said overflow chamber drain and causes the electrolyte to flow through second tubing means into said battery cell when said partial vacuum is removed from said cell, said ball valve in said trap chamber opens, permitting electrolyte in said overflow chamber to flow back through said first tubing means into said electrolyte container.

4. A battery filling device adapted to transfer electrolyte from a container to the cell of a battery comprising, in combination, a housing having an overflow chamber therein, a Venturi having an input adapted to be connected to a source of air under pressure and a throat in communication with said overflow chamber so that a partial vacuum is created in said overflow chamber when air under pressure is passed through said Venturi, first valve means between the throat of said Venturi and said overflow chamber and operative to close upon the flow of electrolyte from said overflow chamber into the throat of said Venturi to shut off the vacuum to said overflow chamber, a drain at the bottom of said overflow chamber connected with a trap chamber, first tubing means connected to said trap chamber and adapted to be inserted into a container of electrolyte, second valve means in said trap chamber adapted to close said drain upon the flow of electrolyte from said trap chamber into said overflow chamber and to be held closed by the partial vacuum in said overflow chamber, a filling head having a nozzle adapted to be projected through the filler opening of a battery cell and having a pair of passages therethrough, second tubing means connecting the first of said passages with said trap chamber, third tubing means connecting the second of said passages with said overflow chamber and a resilient seal carried by said nozzle and adapted to close said filler opening to apply the partial vacuum in said overflow chamber to the battery cell and to said first tubing means through said trap chamber and said second tubing means, to cause electrolyte in said container to be drawn up through said first tubing means into said trap chamber, wherein said valve means closes said overflow chamber drain and causes the electrolyte to flow through said second tubing means into said battery cell, when said partial vacuum is removed from said cell, said valve means in said trap chamber opens, permitting electrolyte in said overflow chamber to flow back through said first tubing means into said electrolyte container.

5. A battery filling device adapted to transfer electrolyte from a container to the cell of a battery comprising, in combination, a housing having an overflow chamber therein, a Venturi having an input adapted to be connected to a source of air under pressure and a throat in communication with said overflow chamber so that a partial vacuum is created in said overflow chamber when air under pressure is passed through said Venturi, a first valve between the throat of said Venturi and said overflow chamber, said first valve comprising a valve ball adapted to seat in a valve seat and shut off the vacuum to said overflow chamber if electrolyte in said overflow chamber rises to the level where it flows through said valve into said Venturi, a drain at the bottom of said overflow chamber connected with a trap chamber, first tubing means connected to said trap chamber and adapted to be inserted into a container of electrolyte, a second valve, said second valve comprising a valve ball located in said trap chamber and adapted to seat in said drain and close said drain upon the flow of electrolyte from said trap chamber into said overflow chamber and to be held closed by the partial vacuum in said overflow chamber, a filling head having a nozzle adapted to be projected through the filler opening of a battery cell and having a pair of passages therethrough, second tubing means connecting the first of said passages with said trap chamber, third tubing means connecting the second of said passages with said overflow chamber and a resilient seal carried by said nozzle and adapted to close said filler opening to apply the partial vacuum in said overflow chamber to the battery cell and to said first tubing means through said trap and said second tubing means, to cause electrolyte in said container to be drawn up through said first tubing means into said trap chamber, wherein said ball valve closes said overflow chamber drain and causes the electrolyte to flow through said second tubing means into said battery cell when said partial vacuum is removed from said cell, said ball valve in said trap chamber opens, permitting electrolyte in said overflow chamber to flow back through said first tubing means into said electrolyte container.

6. A battery filling device adapted to transfer electrolyte from a container to the cell of a battery comprising, in combination, a housing having an overflow chamber therein, a Venturi having an input adapted to be connected to a source of air under pressure and an outlet discharging into a muffler chamber, an exhaust port in said muffler chamber connected to the atmosphere, baffle means in said muffler chamber between the outlet of said Venturi and said exhaust port spaced to provide an increasing volume for the air discharging from said Venturi thereby reducing the velocity of said air prior to discharge to the atmosphere, said Venturi having a throat in communication with said overflow chamber so that a partial vacuum is created in said overflow chamber when air under pressure is passed through said Venturi, first valve means between the throat of said Venturi and said overflow chamber and operative to close upon the flow of electrolyte from said overflow chamber into the throat of said Venturi to shut off the vacuum to said overflow chamber, a drain at the bottom of said overflow chamber connected with a trap chamber, first tubing means connected to said trap chamber and adapted to be inserted into a container of electrolyte, second valve means in said trap chamber adapted to close said drain upon the flow of electrolyte from said trap chamber into said overflow chamber and to be held closed by the partial vacuum in said overflow chamber, a filling head having a nozzle adapted to be projected through the filler opening of a battery cell and having a pair of passages therethrough, the end of the first of said passages being recessed slightly from the end of said second passage in said nozzle, second tubing means connecting the first of said passages with said trap chamber, third tubing means connecting the second of said passages with said overflow chamber, a resilient seal carried by said nozzle and adapted to close said filler opening to apply the partial vacuum in said overflow chamber to the battery cell and to said first tubing means through said trap chamber and said second tubing means, to cause electrolyte in said container to be drawn up through said first tubing means, said trap chamber, and said second tubing means into said battery cell.

7. A battery filling device adapted to transfer electrolyte from a container to the cell of a battery comprising, in combination, a housing having an overflow chamber therein, a Venturi having an input adapted to be connected to a source of air under pressure and an outlet discharging into a muffler chamber, said Venturi having a throat in communication with said overflow chamber so that a partial vacuum is created in said overflow chamber when air under pressure is passed through said Venturi, a first ball valve between the throat of said Venturi and said overflow chamber and operative to close upon the flow of electrolyte from said overflow chamber into the throat of said Venturi to shut off the vacuum to said overflow chamber, a drain at the bottom of said overflow chamber connected with a trap chamber first tubing means connected to said trap chamber and adapted to be inserted into a container of electrolyte, a second ball valve in said trap chamber adapted to close said drain upon the flow of electrolyte from said trap chamber into said overflow chamber and to be held closed by the partial vacuum in said overflow chamber, a filling head having a nozzle adapted to be projected through the filler opening of a battery cell and having a vacuum passage and an electrolyte passage therethrough, the end of said electrolyte passage being recessed in said nozzle from the end of said vacuum passage, second tubing means connecting the electrolyte passage with said trap chamber, third tubing means connecting the vacuum passage with said overflow chamber and a resilient seal carried by said nozzle and adapted to close said filler opening to apply the partial vacuum in said overflow chamber to the battery cell and to said first tubing means through said trap chamber, said second tubing means and said vacuum passage, to cause electrolyte in said container to be drawn up through said first tubing means into said trap chamber, wherein said ball valve closes said overflow chamber drain and causes the electrolyte to flow through said second tubing means and said electrolyte passage into said battery cell, when said partial pressure is removed from said cell, said ball valve in said trap chamber opens, permitting electrolyte in said overflow chamber to flow back through said first tubing means into said electrolyte container.

References Cited

UNITED STATES PATENTS

| | | | |
|---|---|---|---|
| 1,437,916 | 12/1922 | Shelov | 141—59 X |
| 2,771,101 | 11/1956 | Thompson | 141—59 X |
| 2,784,748 | 3/1957 | Eichenlaub | 141—285 X |
| 2,997,880 | 8/1961 | Cook et al. | |

LAVERNE D. GEIGER, *Primary Examiner.*

E. EARLS, *Assistant Examiner.*